(12) United States Patent
Long et al.

(10) Patent No.: US 10,662,866 B2
(45) Date of Patent: May 26, 2020

(54) DIESEL ENGINE AND METHOD FOR FUEL DISTRIBUTION AND COMBUSTION IN COMBUSTION CHAMBER OF DIESEL ENGINE

(71) Applicant: Dalian University of Technology, Dalian, Liaoning (CN)

(72) Inventors: Wuqiang Long, Liaoning (CN); Shuang He, Liaoning (CN); Jiangping Tian, Liaoning (CN); Hua Tian, Liaoning (CN); Baoguo Du, Liaoning (CN); Liyan Feng, Liaoning (CN); Yao Fu, Liaoning (CN); Ping Yi, Liaoning (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 16/386,259

(22) Filed: Apr. 17, 2019

(65) Prior Publication Data
US 2019/0242294 A1    Aug. 8, 2019

Related U.S. Application Data

(63) Continuation-in-part of application No. 15/245,215, filed on Aug. 24, 2016, now abandoned, which is a
(Continued)

(30) Foreign Application Priority Data

Feb. 24, 2014   (CN) .......................... 2014 1 0061414

(51) Int. Cl.
*F02B 23/06*   (2006.01)
*F02F 3/26*     (2006.01)
*F02F 3/24*     (2006.01)

(52) U.S. Cl.
CPC ...... *F02B 23/0621* (2013.01); *F02B 23/0651* (2013.01); *F02B 23/0696* (2013.01); *F02F 3/24* (2013.01); *F02F 3/26* (2013.01)

(58) Field of Classification Search
CPC .. F02B 23/06; F02B 23/0621; F02B 23/0624; F02B 23/0651; F02B 23/0669; F02B 23/0696
(Continued)

(56) References Cited

U.S. PATENT DOCUMENTS 2,792,817 A * 5/1957 Smith ..................... F02B 43/00
                                                           123/65 A
7,185,614 B2 * 3/2007 Meffert ............... F02B 23/0672
                                                           123/269
(Continued)

*Primary Examiner* — John Kwon
*Assistant Examiner* — Johnny H Hoang

(57) ABSTRACT

A diesel engine includes a cylinder head, a cylinder sleeve, a piston, an injector, and a combustion chamber. The top side of the piston includes an annular top surface, an annular collision belt and an annular cavity. The collision belt includes a collision surface, an upper guide surface, and a lower guide surface. An annular throat is formed between the upper guide surface and the cylinder head. The collision belt divides the combustion chamber into a headspace and a central portion. The volume of the headspace is more than three times of the volume of the central portion. A major portion of the fuel jet injected by the injector is directed into the headspace. The results are faster mixing of fuel and air and complete combustion in the combustion chamber, and a reduction of fuel consumption rate by 2%. A method for fuel distribution and combustion is also disclosed.

15 Claims, 9 Drawing Sheets

Related U.S. Application Data continuation-in-part of application No. PCT/CN2015/000103, filed on Feb. 16, 2015.

(58) Field of Classification Search
USPC .......... 123/38 A, 48 B, 48 R, 306, 307, 310
See application file for complete search history.

(56) References Cited

U.S. PATENT DOCUMENTS

| | | | |
|---|---|---|---|
| 8,671,908 B2 * | 3/2014 | Ives .................... | F02B 23/0651 123/145 A |
| 2003/0221657 A1 * | 12/2003 | Sananes .............. | F02B 23/0639 123/276 |
| 2005/0166890 A1 * | 8/2005 | Wickman ............ | F02B 23/0636 123/276 |

* cited by examiner

DIESEL ENGINE AND METHOD FOR FUEL DISTRIBUTION AND COMBUSTION IN COMBUSTION CHAMBER OF DIESEL ENGINE

CROSS-REFERENCE TO RELATED APPLICATIONS

This application is a continuation-in-part application of U.S. patent application Ser. No. 15/245,215 filed Aug. 24, 2016, which is a continuation-in-part of International Patent Application No. PCT/CN2015/000103 with an international filing date of Feb. 16, 2015, designating the United States, now pending, and further claims priority benefits to Chinese Patent Application No. 201410061414.5 filed Feb. 24, 2014. The contents of all of the aforementioned applications, including any intervening amendments thereto, are incorporated herein by reference.

BACKGROUND

Field of the Technology

The present disclosure relates to a diesel engine and a method for fuel distribution and combustion in a combustion chamber of a diesel engine.

Description of the Related Art

Typically, the headspace of the combustion chamber in diesel engines has recesses, and a thick layer of mixed diesel-gas tends to accumulate in the recesses. As a result, the distribution of the mixed oil gas is uneven, the combustion of the diesel is incomplete, the fuel consumption is high, and a large amount of soot is produced. Furthermore, in a conventional diesel engine, the combustion chamber is usually located in a central cavity formed at the center of a top surface of a piston. Most of the fuel injected near the top dead center falls into the central cavity of the piston, and the fuel jet accumulates at the falling point on the wall of the central cavity. During an expanding intake stroke, the piston moves down. Part of the oil mist splashed out from the collision between the fuel jet and the wall of the central cavity will only then flow out of the central cavity and into the headspace where the fuel is mixed with the air in the headspace. This results in a slow mixing of fuel and air and a slow combustion process. This also results in the generation of more soot.

SUMMARY

In order to solve the above problem, it is an objective of the present disclosure to provide a diesel engine with a fuel collision and distribution combustion chamber. Through the cooperation of the shape of the combustion chamber and the fuel distribution in the fuel collision and distribution combustion chamber, a small portion of the fuel jet is rebounded by a collision belt near the top dead center to achieve secondary atomization of the fuel spray, thereby improving fuel spray atomization performance. The remaining large portion of the fuel jet spreads along the collision belt and towards a headspace near the cylinder to complete the mixing of fuel and air and the combustion process.

To achieve the above objective, according to one aspect of the present disclosure, there is provided a diesel engine including a cylinder sleeve; a cylinder head mounted on top of the cylinder sleeve and having a flat bottom surface; a piston slidable in the cylinder sleeve; a combustion chamber delimited by the cylinder sleeve, the cylinder head and the piston; and a fuel injector mounted at a center of the cylinder head for injecting a fuel jet in the combustion chamber. A top side of the piston may include an annular cavity, an annular top surface, and an annular collision belt extending between the annular cavity and the annular top surface. The annular collision belt may include an inclined collision surface, an upper guide surface extending between an upper and outer end of the inclined collision surface and the annular top surface, and a lower guide surface extending between a lower and inner end of the inclined collision surface and the annular cavity. The annular collision belt may divide the combustion chamber into a central portion disposed at an inner side of the annular collision belt, above the annular cavity and below the fuel jet, and a headspace disposed at an outer side of the annular collision belt and delimited by the annular top surface, the cylinder sleeve and the cylinder head. The combustion chamber may further include an annular throat formed between the upper guide surface and the cylinder head. The inclined collision surface may be configured to deflect an upper portion of the fuel jet into the headspace through the annular throat, and deflect a lower portion of the fuel jet into the annular cavity in the central portion. The upper portion of the fuel jet may be greater than the lower portion of the fuel jet. The volume of the headspace may be more than three times of the volume of the central portion.

In one embodiment, the annular top surface is a horizontal surface. The ratio of a height (H1) of the headspace measuring from the horizontal annular top surface to the flat bottom surface of the cylinder head to a diameter (D2) of the piston may be 6%<H1/D2<8% when the piston is at a top dead center. The ratio of a height (H2) of the upper guide surface measuring from the horizontal annular top surface to the highest point of the upper guide surface to the height (H1) of the headspace may be 15%<H2/H1<25%. The ratio of a diameter (D) of the annular throat measuring at a highest point of the upper guide surface of the annular collision belt to the diameter (D2) of the piston may be D/D2<0.45.

In one embodiment, in cross section, the annular cavity may have a circular arc extending between a lower portion of the annular collision belt and a lowest point at a bottom portion of the annular cavity. The lower portion of the annular collision belt may be tangent to the circular arc, and an angle α between a tangent line extending from the lower portion of the annular collision belt tangent to the circular arc and a central axis of the piston is less than 45 degrees.

In one embodiment, the inclined collision surface may be inclined, convex, or concave in cross section. In another embodiment, the inclined collision surface may be tapered in cross section, and may include an upper inclined surface adjoining the annular top surface; a lower inclined surface adjoining the annular cavity; and a middle curved surface extending between the upper inclined surface and the lower inclined surface. In a further embodiment, the inclined collision surface may be tapered in cross section, and may include an upper inclined surface adjoining the annular top surface; a lower concave surface adjoining the annular cavity; and a middle curved surface extending between the upper inclined surface and the lower concave surface. In yet another embodiment, the inclined collision surface may be curved in cross section, and may include an upper convex surface adjoining the annular top surface; and a lower concave surface adjoining the annular cavity.

In one embodiment, the upper guide surface may be convex in cross section.

In one embodiment, the lower guide surface may be flat, curved, right-angled, or concave in cross section.

In one embodiment, the annular top surface may be horizontal or inclined in cross section. In another embodiment, the annular top surface may be concave in cross section and may include an outermost annular inclined surface lower than the upper guide surface. In a further embodiment, the annular top surface may be concave in cross section and may include an outermost annular inclined surface higher than the upper guide surface. In yet another embodiment, the annular top surface may be recessed in cross section, and may include a recessed horizontal surface; an outermost inclined surface; a first transitional surface extending between an inner end of the recessed horizontal surface and the upper guide surface; and a second transitional surface extending between an outer end of the recessed horizontal surface and the outermost inclined surface.

In one embodiment, a center at the top side of the piston may include a basin-shaped bottom surface.

According to another aspect of the present disclosure, there is provided a method for fuel distribution and combustion in the above-mentioned diesel engine. The method may include the steps of (i) setting a height (H1) of the headspace measuring from a horizontal surface of the annular top surface to the flat bottom surface of the cylinder head so that a ratio of the height (H1) of the headspace to a diameter (D2) of the piston may be 6%<H1/D2<8% when the piston is at a top dead center; (ii) setting a diameter (D) of the annular throat measuring at a highest point of the upper guide surface of the annular collision belt so that a ratio of the diameter (D) of the annular throat to the diameter (D2) of the piston may be D/D2<0.45; (iii) injecting the fuel jet from the fuel injector towards the inclined collision surface so that the upper portion of the fuel jet is deflected towards the upper guide surface and the lower portion of the fuel jet is deflected towards the lower guide surface, the upper portion of the fuel jet being greater than the lower portion of the fuel jet; (iv) guiding, by the upper guide surface, the entire upper portion of the fuel jet through a lower region of the annular throat and into a lower region of the headspace; (v) directing, by the annular top surface, the upper portion of the fuel jet radially outwards towards the cylinder sleeve; (vi) driving the upper portion of the fuel jet upwards along an inner surface of the cylinder sleeve, radially inwards along an upper region of the headspace, and then through an upper region of the annular throat; and (vii) guiding, by the lower guide surface, the lower portion of the fuel jet towards the annular cavity.

In one embodiment, the method may further include the step of, before the injecting step, setting a height (H2) of the upper guide surface measuring from the horizontal surface of the annular top surface to the highest point of the upper guide surface so that a ratio of the height (H2) of the upper guide surface to the height (H1) of the headspace may be 15%<H2/H1<25%.

In one embodiment, the method may further include the steps of, before the injecting step, (i) providing the annular cavity with a circular arc in cross section extending between a lower portion of the annular collision belt and a lowest point at a bottom portion of the annular cavity, wherein the lower portion of the annular collision belt is tangent to the circular arc; and (ii) setting an angle α between a tangent line extending from the lower portion of the annular collision belt tangent to the circular arc and a central axis of the piston so that the angle α is less than 45 degrees.

Advantages of the diesel engine according to the embodiments of the present disclosure are summarized as follows:

The combustion chamber of diesel engine is divided into two portions: the headspace and the central portion. The collision belt is disposed between the headspace and the central portion. The fuel injector injects diesel oil mist on the collision belt, and one part of the diesel oil mist rebounds from the collision belt and the diesel oil mist is atomized twice, and the other part of the diesel oil mist is distributed along the collision belt towards the headspace and the central portion, respectively, thus the oil and the air are uniformly mixed. The combustion chamber is expanded in order to increase the speed of mixing of diesel oil and air, enabling a relatively lean diffusion combustion in the combustion chamber, thereby decreasing the emission of soot and NOx, and effectively improving the combustion of diesel engine. Thus, the combustion chamber is economical. At rated load, compared with a conventional system, the combustion chamber in the present disclosure has the economy increased by 4%, the soot emission decreased by 50%, and the NOx emission decreased by 8%. Furthermore, the air in the headspace close to the cylinder sleeve can be mixed with the fuel earlier, the combustion process can be completed faster, and the fuel consumption rate can be reduced by 2%.

BRIEF DESCRIPTION OF THE DRAWINGS

The present disclosure is described hereinbelow with reference to the accompanying drawings, in which.

Figure 1:
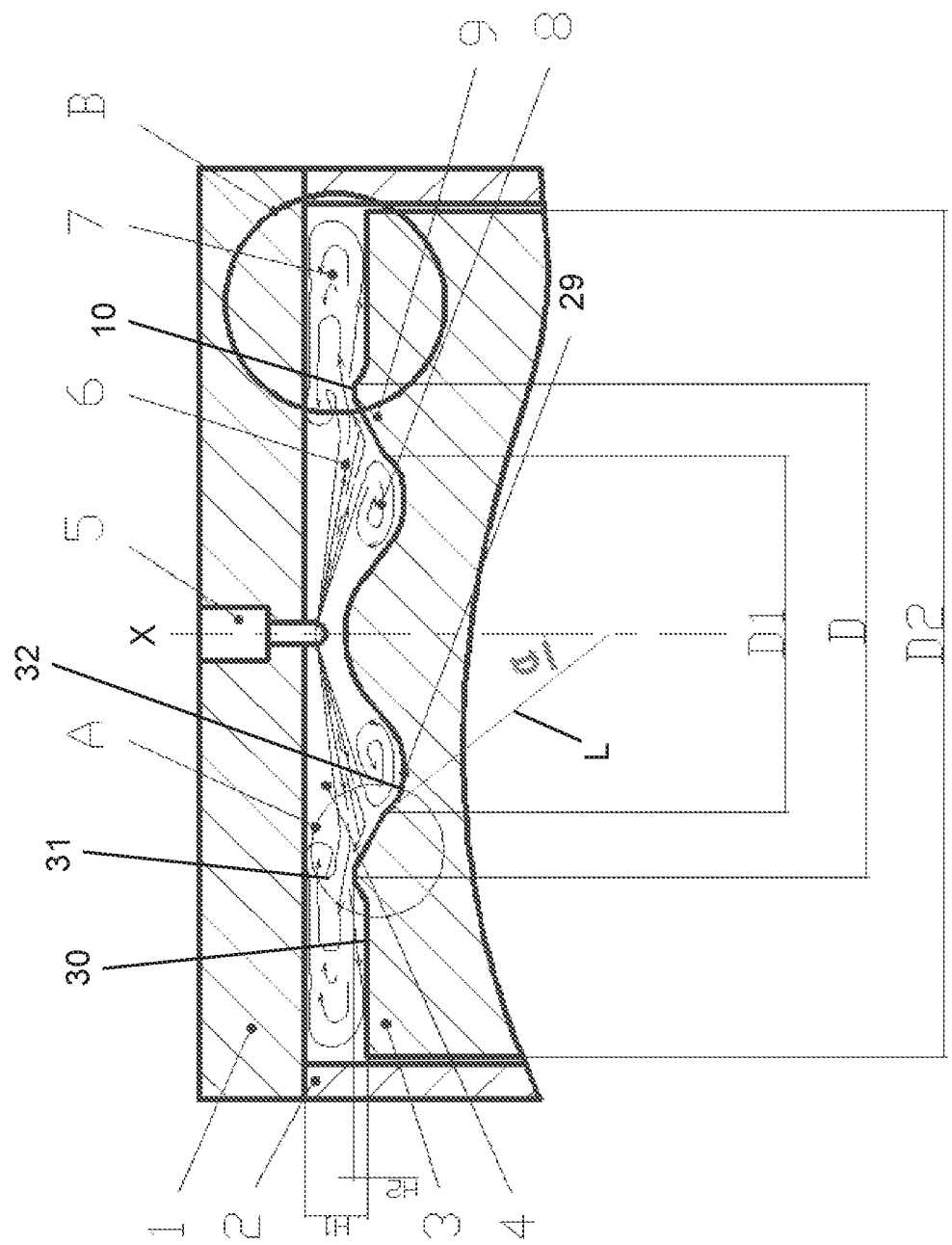
FIG. 1 is a schematic diagram of a combustion chamber of diesel engine in accordance with one embodiment of the present disclosure.

In the drawings, the following reference numbers are used: 1. Cylinder head; 2. Cylinder sleeve; 3. Piston; 4. Combustion chamber; 5. Fuel injector; 6. Fuel jet; 7. Headspace; 8. Central portion; 9. Collision belt; 10. Third convex surface; 11. First inclined surface; 12. First convex surface; 13. First concave surface; 14. First tapered surface; 14a. Second inclined surface; 14b. Second curved surface; 14c. Third inclined surface; 15. Second tapered surface; 15a. Fourth inclined surface; 15b. Third curved surface; 15c. Second concave surface; 16. First curve surface; 16a. Second convex surface; 16b. Third concave surface; 17. First flat surface; 18. Second flat surface; 19. Fourth curved surface; 20. First right-angled surface; 21. Fourth concave surface; 22. Fifth inclined surface; 23. Sixth inclined surface; 24. First guide surface; 24a. Fifth concave surface; 24b. Seventh inclined surface; 25. Second guide surface; 25a. Sixth concave surface; 25b. Eighth inclined surface; 26. Third guide surface; 26a. First transitional surface; 26b. Ninth inclined surface; 26c. Second transitional surface; 26d. Tenth inclined surface; 27. W-shaped bottom surface; 28. Basin-shaped bottom surface; 29. Annular cavity; 30. Annular top surface; 31. Annular throat; and 32. Circular arc.

DETAILED DESCRIPTION OF THE EMBODIMENTS

For further illustrating the present disclosure, some embodiments of the diesel engine are described below. It should be noted that the following embodiments are intended to describe and not to limit the present disclosure.

FIG. 1 is a schematic diagram of a combustion chamber of a diesel engine in accordance with one embodiment of the present disclosure. As shown in FIG. 1, the diesel engine may include a cylinder head 1 mounted on top of a cylinder sleeve 2, and a piston 3 slidable in the cylinder sleeve 2. The cylinder head 1 may have a flat bottom surface. A combustion chamber 4 may be delimited by the cylinder head 1, the cylinder sleeve 2 and the piston 3. A fuel injector 5 may be mounted at a center of the cylinder head 1 for injecting a fuel jet 6 in the combustion chamber 4. A top side of the piston 3 may include an annular cavity 29, an annular top surface 30, and an annular collision belt 9 extending between the annular cavity 29 and the annular top surface 30. The annular collision belt 9 may include an inclined collision surface 11-16, an upper guide surface 10 extending between an upper and outer end of the inclined collision surface 11-16 and the annular top surface 30, and a lower guide surface 18-21 extending between a lower and inner end of the inclined collision surface 11-16 and the annular cavity 29. The annular top surface 30 may be a horizontal surface, as depicted in FIG. 1.

The annular collision belt 9 may divide the combustion chamber 4 into a central portion 8 disposed at an inner side of the annular collision belt 9, above the annular cavity 29 and below the fuel jet 6, and a headspace 7 disposed at an outer side of the annular collision belt 9 and delimited by the annular top surface 30, the cylinder sleeve 2 and the cylinder head 1. The annular cavity 29 in the central portion 8 may have an outer diameter of (D1). The combustion chamber 4 may further include an annular throat 31 formed between the upper guide surface 10 and the cylinder head 1. The inclined collision surface 11-16 may be configured to deflect an upper portion of the fuel jet 6 into the headspace 7 through the annular throat 31, and deflect a lower portion of the fuel jet 6 into the annular cavity 31 in the central portion 8. The upper portion of the fuel jet 6 may be greater than the lower portion of the fuel jet 6.

The present disclosure provides a diesel engine with a fuel collision and distribution combustion chamber. Through the cooperation of the shape of the combustion chamber and fuel distribution in the fuel collision and distribution combustion chamber, a small portion of the fuel jet may be rebounded by the collision belt 9 near the top dead center to achieve secondary atomization of the fuel spray, thereby improving fuel spray atomization performance. The remaining large portion of the fuel jet may be spread along the annular collision belt 9, directed into the headspace 7 and towards the cylinder sleeve 2. This results in a much faster mixing of fuel and air and combustion in the combustion chamber.

In the present disclosure, the height H1 of the headspace 7 can be increased and the diameter D of the annular throat 31 can be reduced. The annular collision belt 9 may be disposed around the outer periphery of the annular cavity 31 provided in the central portion 8 of the combustion chamber. A lower portion of the annular collision belt 9 may be tangent to the wall of the annular cavity 31. The upper side of the annular collision belt 9 may be connected to the annular top surface 30. The highest point of the annular collision belt 9 may be higher than the annular top surface 30.

The height H1 is the distance from the horizontal surface of the annular top surface 30 disposed between the annular collision belt 9 and the cylinder sleeve 2 to the flat bottom surface of the cylinder head 1. The piston 3 may have a diameter D2. The ratio of H1 to D2 may be 6%<H1/D2<8% when the piston is at the top dead center.

The height H2 is the height of the upper guide surface 10 measuring from the horizontal annular top surface 30 disposed between the annular collision belt 9 and the cylinder sleeve 2 to the highest point of the upper guide surface 10. The ratio of H2 to H1 may be 15%<H2/H1<25%.

The ratio of the diameter D of the annular throat 31 measuring at the highest point of the annular collision belt 9 to the diameter D2 of the piston may be D/D2<0.45.

The volume of the headspace 7 may be more than 3 times of the volume of the central portion 8. During compression and working strokes, the volume of the headspace 7 may be at all times greater than the volume of the central portion 8. After the fuel jet 6 collides with the annular collision belt 9, most of the fuel jet 6 can be directed towards the headspace 7 where the fuel and air are mixed and the combustion process is completed.

In the cross sectional view of the combustion chamber shown in FIG. 1, it can be seen that the annular cavity 29 may have a circular arc 32 extending between a lower portion of the annular collision belt 9 and a lowest point at a bottom portion of the annular cavity 29. The lower portion of the annular collision belt 9 may be tangent to the circular arc 32. An angle α between a tangent line L extending from the lower portion of the annular collision belt 9 tangent to the circular arc and a central axis X of the piston 3 may be less than 45 degrees. This geometric condition can make the annular cavity 29 of the combustion chamber to be in an open form. After the fuel jet 6 collides with the annular collision belt 9, most of the oil mist flows towards the outer periphery of the combustion chamber 4. This can reduce the amount of oil mist that flows to the bottom portion of the annular cavity 29. Thus, the range of fuel distribution can become larger, and the mixing of fuel and air can be enhanced.

Compared to the prior art, the shape and size of the headspace 7 of the present disclosure can be set up such that most of the mixing of fuel and air can be completed in the headspace 7 near the top dead center, rendering much faster fuel and air mixing and combustion. In U.S. Pat. No. 8,671,908, the fuel near the top dead center (first portion 1 of the fuel jet and second portion 2 of the fuel jet) is mainly concentrated at a central portion 8 of the combustion chamber 4. Only when the piston moves downwards during a working stroke, a portion of the fuel (third portion 3 of the fuel jet) will then be spread to the outer periphery of the combustion chamber. This results in a slow mixing of fuel and air and combustion. On the other hand, in the present disclosure, the diameter D of the annular throat 31 may be set such that the ratio of the diameter D of the annular throat 31 to the diameter D2 of the piston 3 may be D/D2<0.45. The height H1 of the headspace 7 may also be set so that the ratio of the height H1 of the headspace 7 to the diameter D2 of the piston 3 may be 6%<H1/D2<8% when the piston 3 is at the top dead center. During compression and working strokes, the volume of the headspace 7 can be at all times greater than the volume of the central portion 8. Therefore, after the fuel jet 6 collides with the annular collision belt 9, most of the fuel jet 6 can be directed to the headspace 7 where fuel and air are mixed and the combustion process is completed. Unexpected results of the present disclosure are that the air in the headspace 7 close to the cylinder sleeve 2 can be mixed with the fuel earlier, the combustion process can be completed faster, and the fuel consumption rate can be reduced by 2%.

Figure 2:
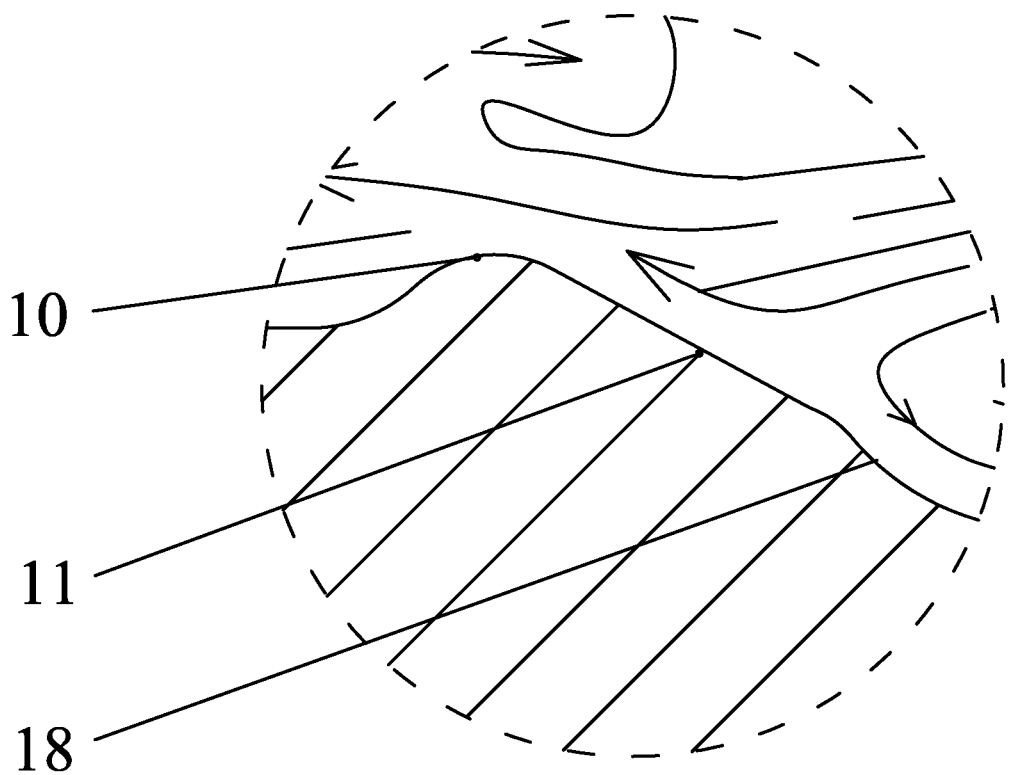
FIG. 2 is an enlarged view taken from part A in FIG. 1 showing that a collision belt is a first inclined surface.
Figure 3:
FIG. 3 is a schematic diagram showing that a collision surface is a first convex surface in accordance with one embodiment of the present disclosure.
Figure 4:
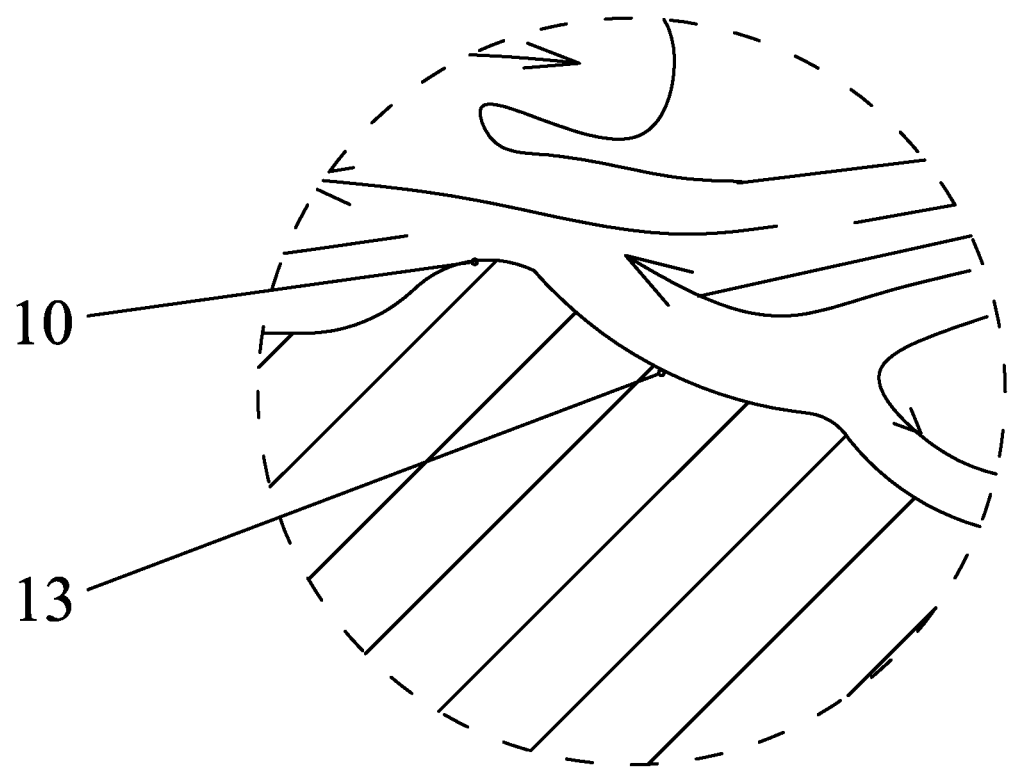
FIG. 4 is a schematic diagram showing that a collision surface is a first concave surface in accordance with one embodiment of the present disclosure.

FIGS. 2-4 are schematic diagrams of three types of inclined collision surfaces. The inclined collision surface may be a first inclined surface 11, a first convex surface 12, or a first concave surface 13. A third convex surface 10 may be corresponding to an inclined angle of the first inclined surface 11, the first convex surface 12, and the first concave surface 13. An injection angle of the diesel oil mist 6 injected by the fuel injector 5 can be adjusted correspondingly, so as to control a distribution proportion of diesel oil in the headspace 7 and in the central portion 8.

Figure 5:
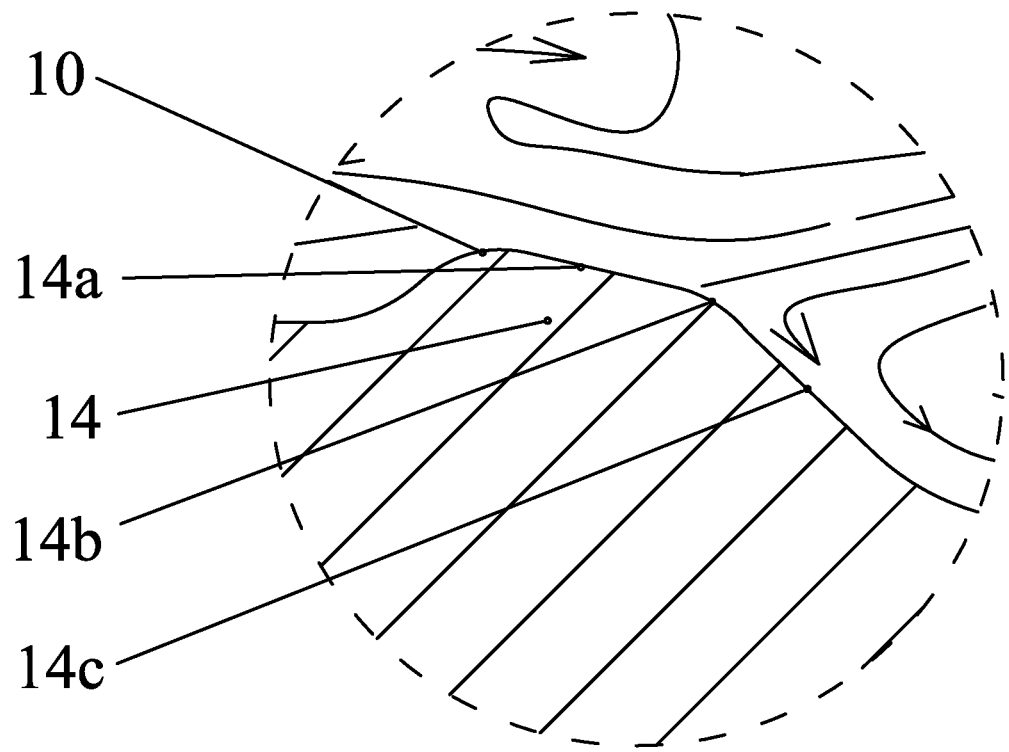
FIG. 5 is a schematic diagram showing that a collision surface is a first tapered surface in accordance with one embodiment of the present disclosure.
Figure 6:
FIG. 6 is a schematic diagram showing that a collision surface is a second tapered surface in accordance with one embodiment of the present disclosure.
Figure 7:
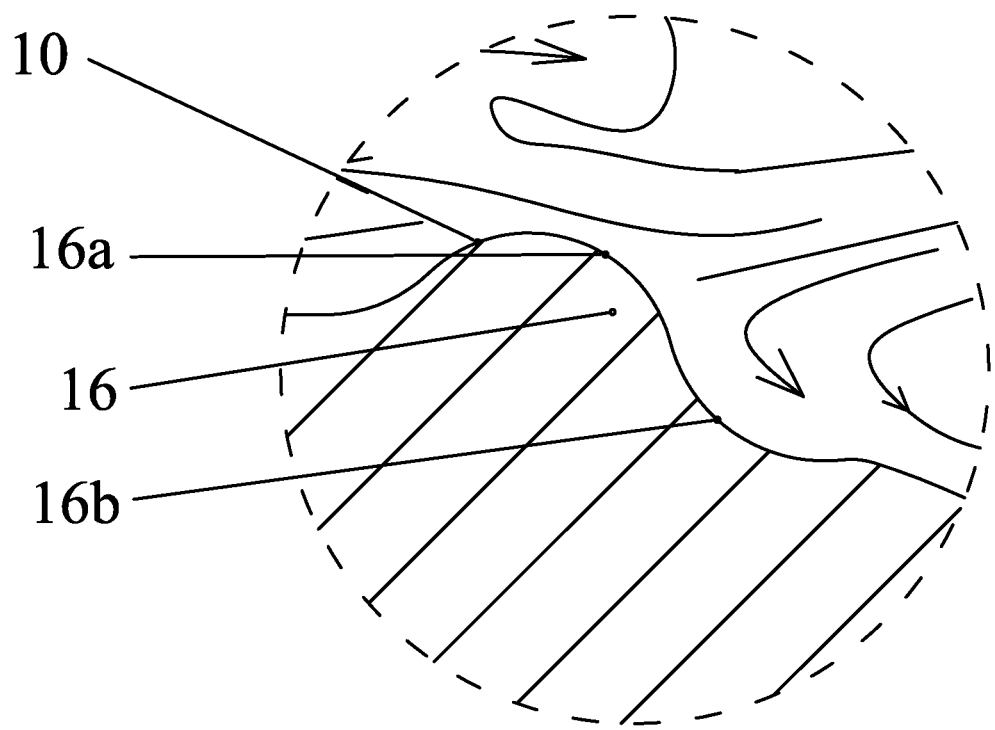
FIG. 7 is a schematic diagram showing that a collision surface is a first curved surface in accordance with one embodiment of the present disclosure.

FIGS. 5-7 are schematic diagrams of another three types of inclined collision surfaces. The inclined collision surface may be a first tapered surface 14, a second tapered surface 15, or a first curved surface 16. The first tapered surface 14 may include a second inclined surface 14a, a second curved surface 14b, and a third inclined surface 14c. The second tapered surface 15 may include a fourth inclined surface 15a, a third curved surface 15b, and a second concave surface 15c. The first curved surface 16 may include a second convex surface 16a and a third concave surface 16b. The injection angle of the diesel oil mist 6 injected by the fuel injector 5 on the first tapered surface 14, the second tapered surface 15, or the first curved surface 16 can be adjusted correspondingly, so as to control a distribution proportion of diesel oil in the headspace 7 and in the central portion 8.

Figure 8:
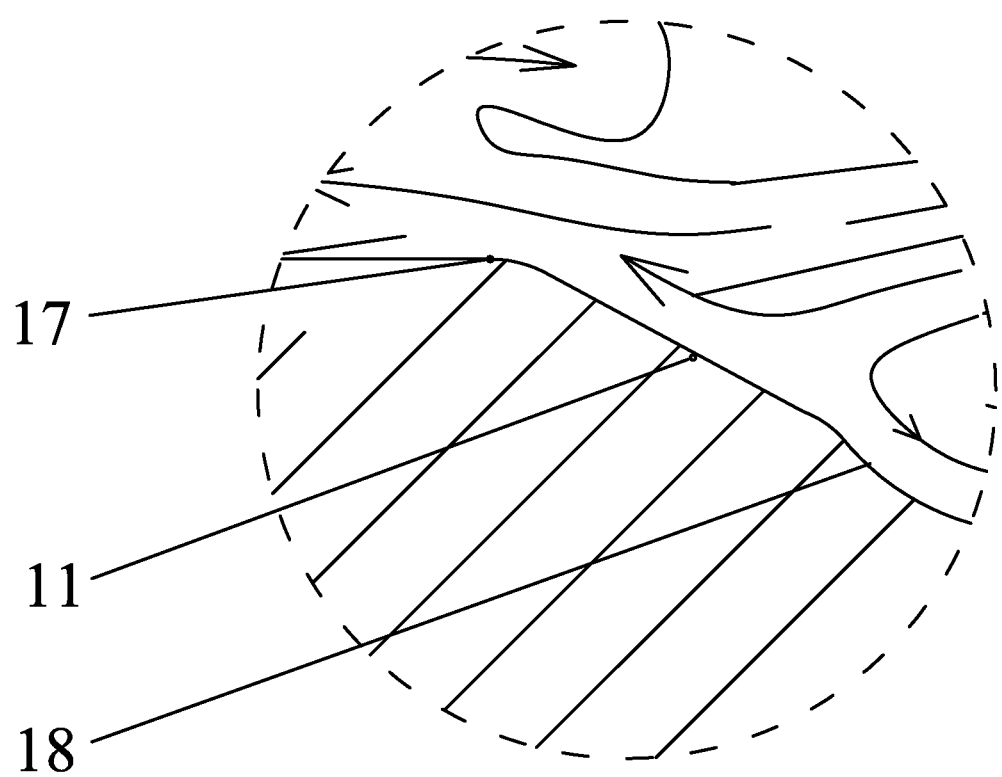
FIG. 8 is a schematic diagram showing that an upper guide surface is a first flat surface, and a lower guide surface is a second flat surface in accordance with one embodiment of the present disclosure.
Figure 9:
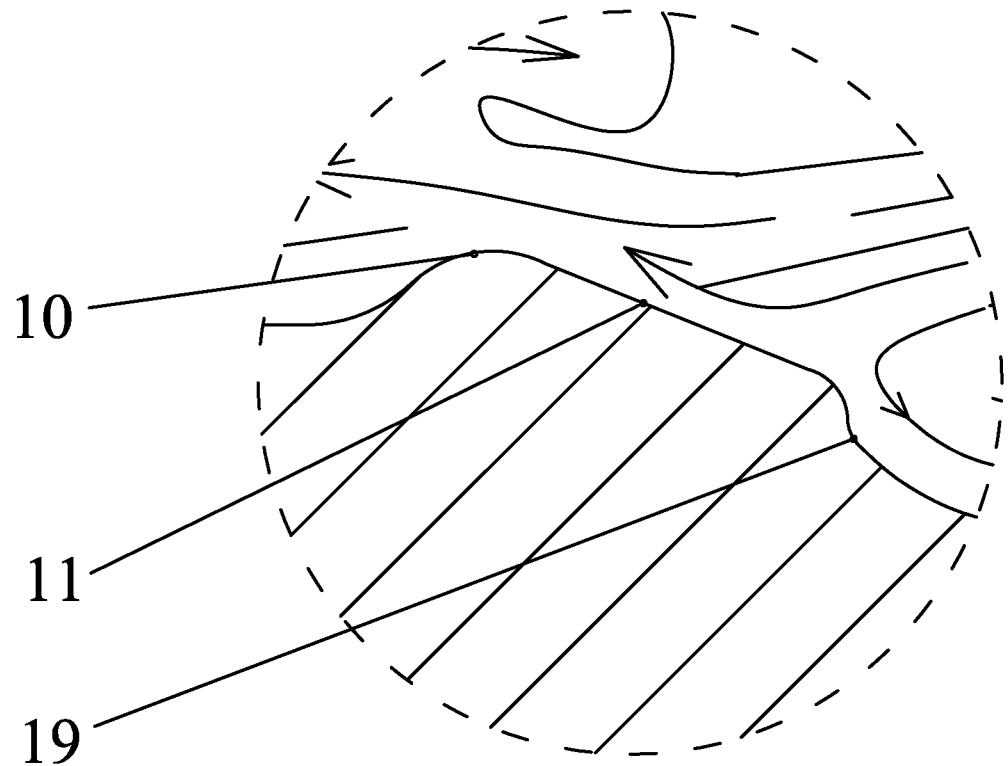
FIG. 9 is a schematic diagram showing that a lower guide surface is a fourth curved surface in accordance with one embodiment of the present disclosure.
Figure 10:
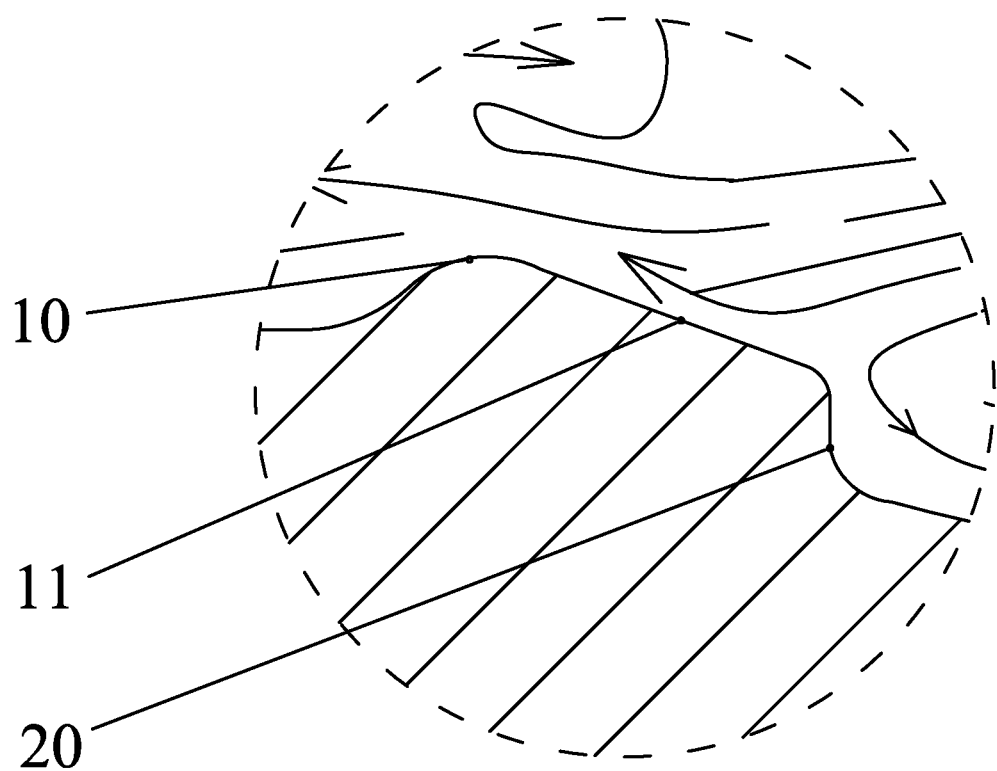
FIG. 10 is a schematic diagram showing that a lower guide surface is a first right-angled surface in accordance with one embodiment of the present disclosure.
Figure 11:
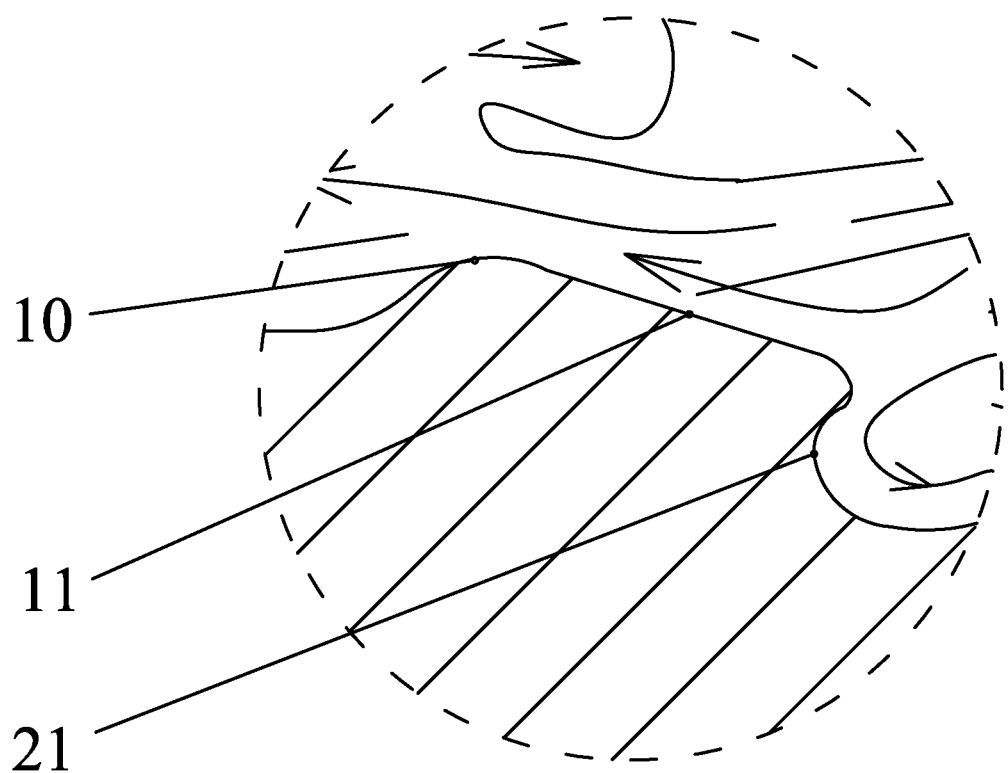
FIG. 11 is a schematic diagram showing that a lower guide surface is a fourth concave surface in accordance with one embodiment of the present disclosure.

FIGS. 8-9 are schematic diagrams of upper guide surfaces. The upper guide surface is a third convex surface 10 or a first flat surface 17. The third convex surface 10 is disposed higher than a top surface of the piston. The first flat surface 17 is at an equal height as the top surface of the piston. The injection angle of the diesel oil mist 6 injected by the fuel injector 5 on the first inclined surface 11 is adjusted correspondingly, so as to control a distribution proportion of diesel oil in the headspace 7 and in the central portion 8.

FIGS. 2, 8, 9, 10, and 11 are schematic diagrams of lower guide surfaces. The lower guide surface is a second flat surface 18, a fourth curved surface 19, a first right-angled surface 20, or a fourth concave surface 21. The injection angle of the diesel oil mist 6 injected by the fuel injector 5 on the first inclined surface 11 is adjusted correspondingly, so as to control a distribution proportion of diesel oil in the headspace 7 and in the central portion 8.

Figure 12:
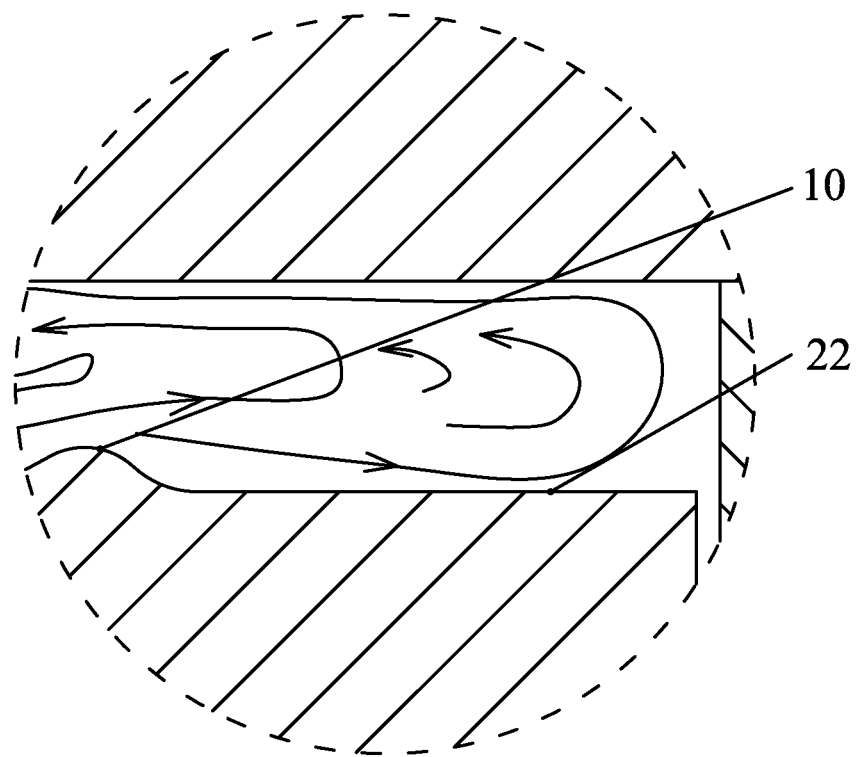
FIG. 12 is an enlarged view taken from part B in FIG. 1 showing that a top surface of the piston is a fifth inclined surface.
Figure 13:
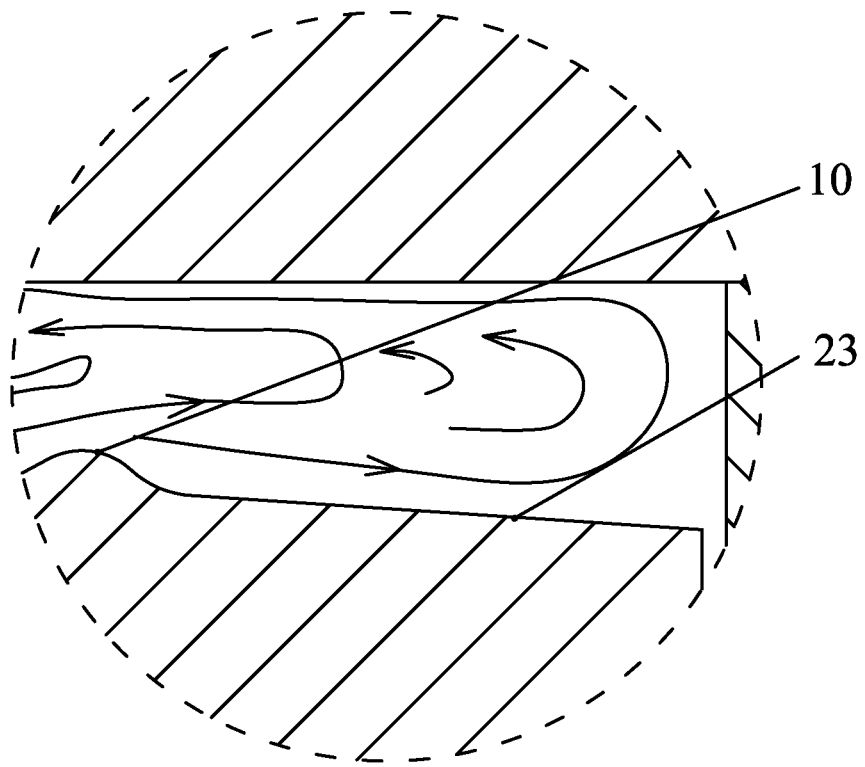
FIG. 13 is a schematic diagram showing that a top surface of the piston is a sixth inclined surface in accordance with one embodiment of the present disclosure.

FIGS. 12-13 are schematic diagrams of top surfaces of piston. The top surface of the piston is a fifth inclined surface 22 or a sixth inclined surface 23, so that the diesel oil mist in the headspace 7 is quickly mixed and forms the uniformly mixed gas.

Figure 14:
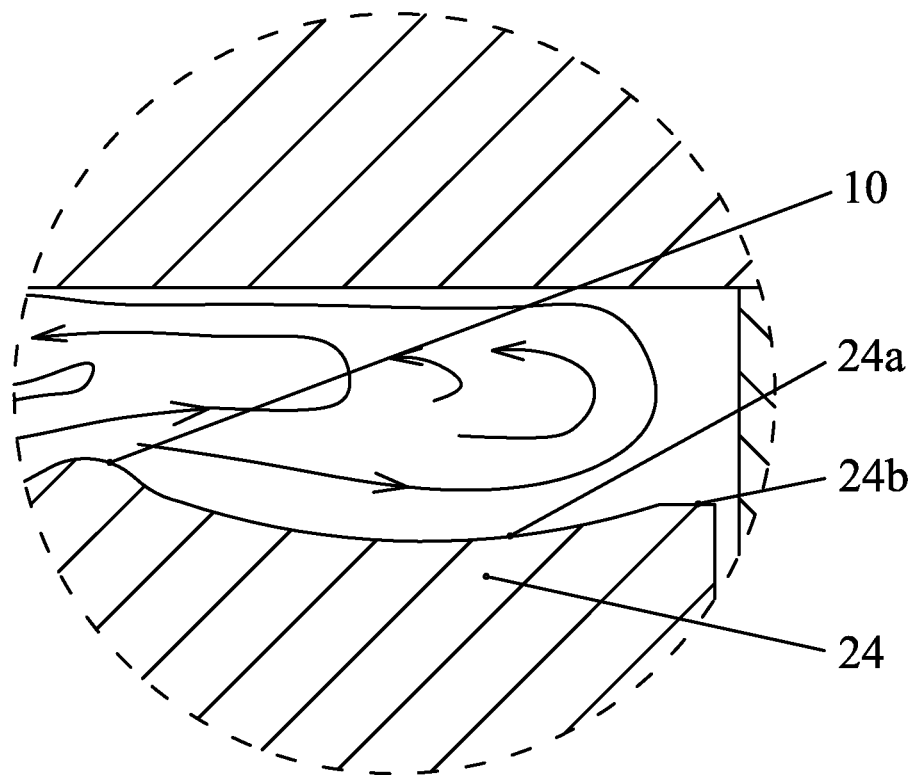
FIG. 14 is a schematic diagram showing that a top surface of the piston is a first guide surface in accordance with one embodiment of the present disclosure.

FIG. 14 is a schematic diagram showing that the top surface of the piston is a first guide surface. The top surface of the piston is the first guide surface 24 comprising a fifth concave surface 24a and a seventh inclined surface 24b. The seventh inclined surface 24b is disposed lower than the third convex surface 10, so that the diesel oil mist in the headspace 7 is quickly mixed and forms the uniformly mixed gas.

Figure 15:
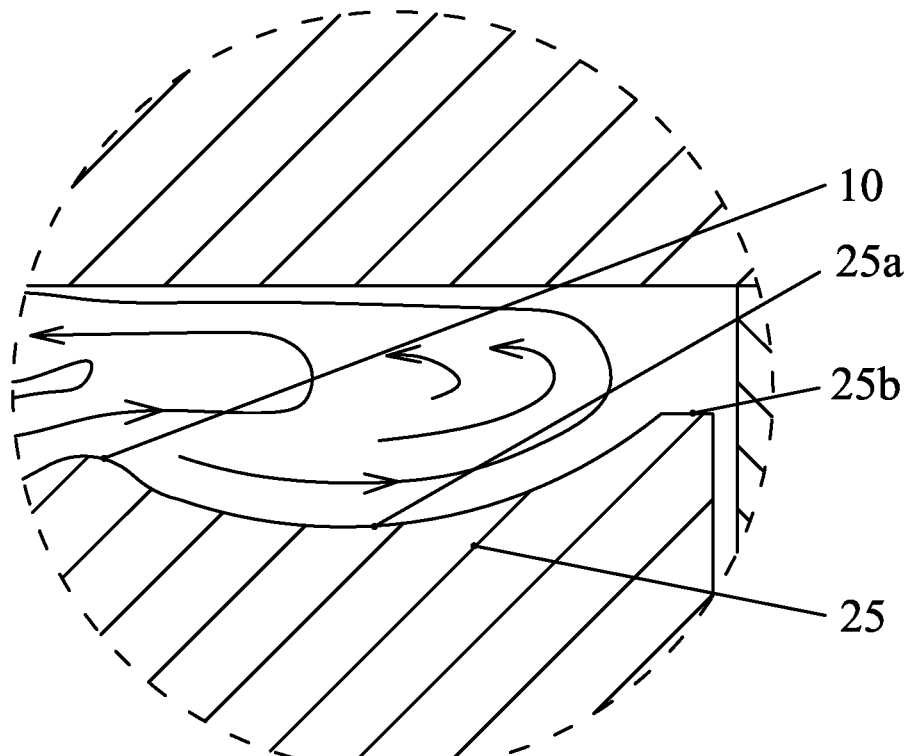
FIG. 15 is a schematic diagram showing that a top surface of the piston is a second guide surface in accordance with one embodiment of the present disclosure.

FIG. 15 is a schematic diagram showing that the top surface of the piston is a second guide surface. The top surface of the piston is the second guide surface 25 comprising a sixth concave surface 25a and an eighth inclined surface 25b. The eighth inclined surface 25b is disposed higher than the third convex surface 10, so that the diesel oil mist in the headspace 7 is quickly mixed and forms the uniformly mixed gas.

Figure 16:
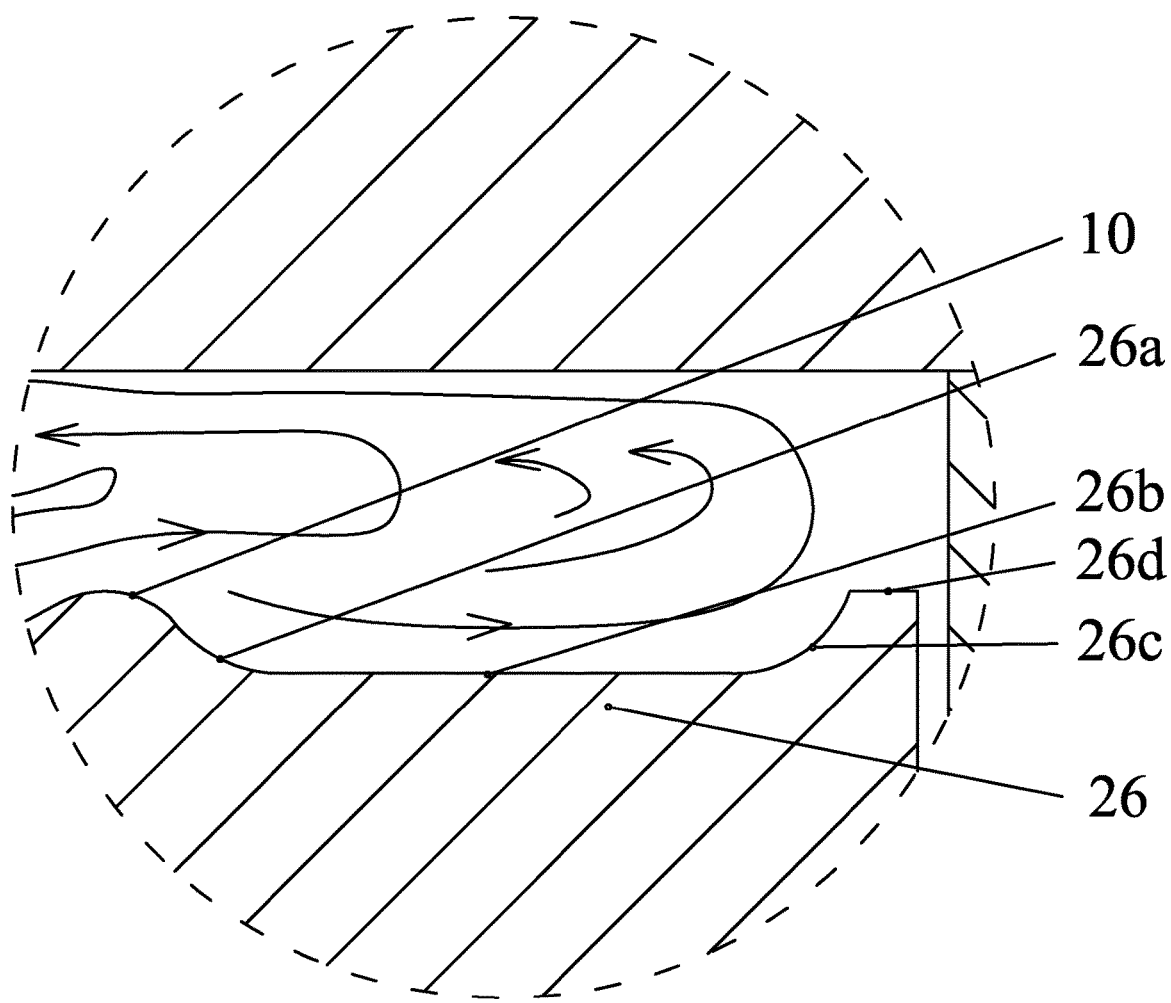
FIG. 16 is a schematic diagram showing that a top surface of the piston is a third guide surface in accordance with one embodiment of the present disclosure.

FIG. 16 is a schematic diagram showing that the top surface of the piston is a third guide surface. The top surface of the piston is the third guide surface 26 comprising a first transitional surface 26a, a ninth inclined surface 26b, a second transitional surface 26c, and a tenth inclined surface 26d, so that the diesel oil mist in the headspace 7 is quickly mixed and forms the uniformly mixed gas.

Figure 17:
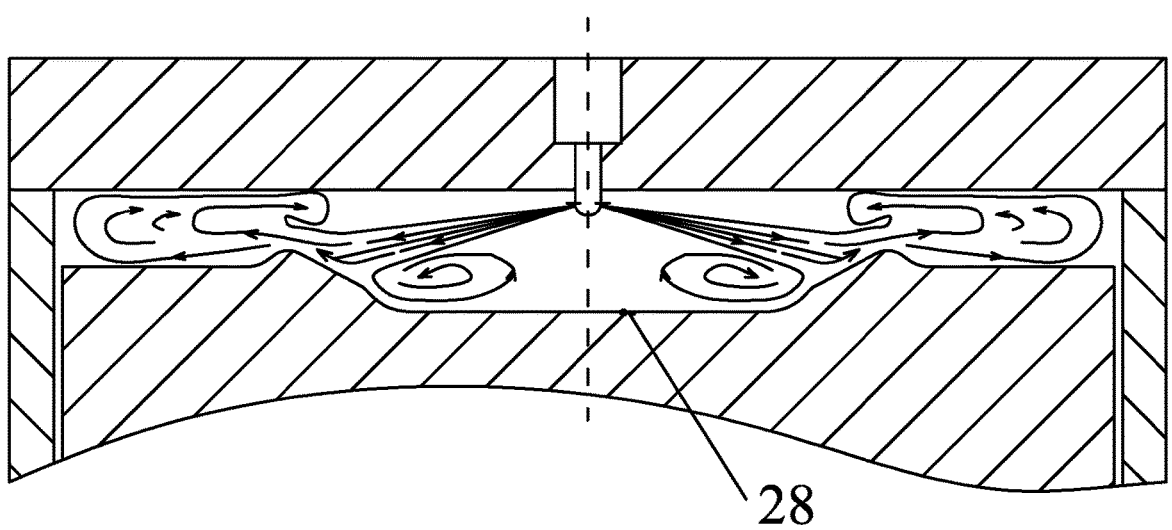
FIG. 17 is a schematic diagram showing that a central portion of a combustion chamber has a basin-shaped bottom surface.

FIG. 17 is a schematic diagram showing that a central portion of a combustion chamber has a basin-shaped bottom surface 28.

The collision belt of the combustion chamber is designed to have the following six types of collision surfaces:

(1) The collision surface is an inclined surface; (2) The collision surface is a convex and curved surface; (3) The collision surface is a concave and curved surface; (4) The collision surface comprises two tapered surfaces, and the transitional surface between the two tapered surfaces is smooth; (5) The collision surface comprises an inclined surface and a concave and curved surface, the transitional surface between the inclined surface and the concave and curved surface is smooth; and (6) The collision surface comprises a convex and curved surface and a concave and curved surface; the transitional surface between the convex and curved surface and the concave and curved surface is smooth.

Optionally, the upper guide surface is a convex surface or a flat surface. The convex surface is disposed higher than the top surface of the piston. The flat surface is at an equal height as the top surface of the piston.

Optionally, the lower guide surface is a flat surface, a curved surface, a right-angled arc surface, or a concave surface.

The top surface of the piston is designed to have the following five types of guide surfaces:

(1) The guide surface is an inclined surface; (2) The guide surface comprises a concave and curved surface and an inclined surface, the inclined surface is disposed lower than the convex surface of the upper guide surface; (3) The guide surface comprises a concave and curved surface and an inclined surface, the inclined surface is disposed higher than the convex surface of the upper guide surface; (4) The guide surface comprises a basin-shaped surface and an inclined surface; and (5) The central portion has a W-shaped or a basin-shaped bottom surface.

The different bottom surfaces of the central portion facilitate different airflow motion, enabling the combustion chamber to be applied to different diesel engines and different working conditions.

Different collision surfaces are combined with the upper and lower guide surfaces to form different collision belts.

Different collision belts are combined with different guide surfaces of the top surface to form different combustion chambers.

The fuel injector injects diesel oil mist on the collision belt, and one part of the diesel oil mist rebounds from the collision belt and the diesel oil mist is atomized twice, while the other part of the diesel oil mist is distributed along the collision belt. The upper guide surface, the lower guide surface, and the guide surface of the top surface are adapted to guide the airflow in the cylinder, increase the disturbance in the cylinder, promote the tumble motion, and improve the air entrainment. The combustion chamber enables the diesel oil mist to be quickly distributed and atomized, meanwhile expands the headspace of the diesel engine, so that the mixed gas quickly becomes uniform, and the air utilization rate is improved.

A method for fuel distribution and combustion in the above-mentioned diesel engine is also disclosed. The method may include the steps of (i) setting a height (H1) of the headspace measuring from a horizontal surface of the annular top surface 30 to the flat bottom surface of the cylinder head 1 so that a ratio of the height (H1) of the headspace 7 to a diameter (D2) of the piston 3 may be 6%<H1/D2<8% when the piston 3 is at a top dead center; (ii) setting a diameter (D) of the annular throat 31 measuring at a highest point of the upper guide surface 10 of the annular collision belt 9 so that a ratio of the diameter (D) of the annular throat 31 to the diameter (D2) of the piston 3 may be D/D2<0.45; (iii) injecting the fuel jet 6 from the fuel injector 5 towards the inclined collision surface 11-16 so that the upper portion of the fuel jet 6 can be deflected towards the upper guide surface 10 and the lower portion of the fuel jet 6 can be deflected towards the lower guide surface 18-21, the upper portion of the fuel jet 6 being greater than the lower portion of the fuel jet 6; (iv) guiding, by the upper guide surface 10, the entire upper portion of the fuel jet 6 through a lower region of the annular throat 31 and into a lower region of the headspace 7; (v) directing, by the annular top surface 30, the upper portion of the fuel jet 6 radially outwards towards the cylinder sleeve 2; (vi) driving the upper portion of the fuel jet 6 upwards along an inner surface of the cylinder sleeve 2, radially inwards along an upper region of the headspace 7, and then through an upper region of the annular throat 31; and (vii) guiding, by the lower guide surface 18-21, the lower portion of the fuel jet 6 towards the annular cavity 29.

The method may further include the step of, before the injecting step, setting a height (H2) of the upper guide surface 30 measuring from the horizontal surface of the annular top surface 30 to the highest point of the upper guide surface 10 so that a ratio of the height (H2) of the upper guide surface 10 to the height (H1) of the headspace 7 may be 15%<H2/H1<25%.

The method may further include the steps of, before the injecting step, (i) providing the annular cavity 29 with a circular arc 32 in cross section extending between a lower portion of the annular collision belt 9 and a lowest point at a bottom portion of the annular cavity 29, wherein the lower portion of the annular collision belt 9 may be tangent to the circular arc 32; and (ii) setting an angle α between a tangent line L extending from the lower portion of the annular collision belt 9 tangent to the circular arc 32 and a central axis X of the piston 3 so that the angle α may be less than 45 degrees.

Unless otherwise indicated, the numerical ranges involved in the present disclosure include the end values. While particular embodiments of the present disclosure have been shown and described, it will be obvious to those skilled in the art that changes and modifications may be made without departing from the present disclosure in its broader aspects, and therefore, the aim in the appended claims is to cover all such changes and modifications as fall within the true spirit and scope of the present disclosure.

What is claimed is:

1. A diesel engine, comprising:
   a cylinder sleeve;
   a cylinder head mounted on top of the cylinder sleeve and having a flat bottom surface;
   a piston slidable in the cylinder sleeve;
   a combustion chamber delimited by the cylinder sleeve, the cylinder head and the piston; and
   a fuel injector mounted at a center of the cylinder head for injecting a fuel jet in the combustion chamber,
   a top side of the piston comprising an annular cavity, a horizontal annular top surface, and an annular collision belt extending between the annular cavity and the horizontal annular top surface,
   the annular collision belt comprising an inclined collision surface, an upper guide surface extending between an upper and outer end of the inclined collision surface and the horizontal annular top surface, and a lower guide surface extending between a lower and inner end of the inclined collision surface and the annular cavity,
   the annular collision belt dividing the combustion chamber into a central portion disposed at an inner side of the annular collision belt, above the annular cavity and below the fuel jet, and a headspace disposed at an outer side of the annular collision belt and delimited by the horizontal annular top surface, the cylinder sleeve and the cylinder head,
   the combustion chamber further comprising an annular throat formed between the upper guide surface and the cylinder head,
   the inclined collision surface being configured to deflect an upper portion of the fuel jet into the headspace through the annular throat, and deflect a lower portion of the fuel jet into the annular cavity in the central portion, the upper portion of the fuel jet being greater than the lower portion of the fuel jet, wherein a volume of the headspace is more than three times of a volume of the central portion, a ratio of a height (H1) of the headspace measuring from the horizontal annular top surface to the flat bottom surface of the cylinder head to a diameter (D2) of the piston is 6%<H1/D2<8% when the piston is at a top dead center, a ratio of a diameter (D) of the annular throat measuring at a highest point of the upper guide surface of the annular collision belt to the diameter (D2) of the piston is D/D2<0.45, a ratio of a height (H2) of the upper guide surface measuring from the horizontal annular top surface to the highest point of the upper guide surface to the height (H1) of the headspace is 15%<H2/H1<25%, and in cross section, the annular cavity has a circular arc extending between a lower portion of the annular collision belt and a lowest point at a bottom portion of the annular cavity, the lower portion of the annular collision belt is tangent to the circular arc, and an angle α between a tangent line extending from the lower portion of the annular collision belt tangent to the circular arc and a central axis of the piston is less than 45 degrees.

2. The diesel engine according to claim 1, wherein the inclined collision surface is inclined, convex, or concave in cross section.

3. The diesel engine according to claim 1, wherein the inclined collision surface is tapered in cross section, and comprises an upper inclined surface adjoining the annular top surface; a lower inclined surface adjoining the annular cavity; and a middle curved surface extending between the upper inclined surface and the lower inclined surface.

4. The diesel engine according to claim 1, wherein the inclined collision surface is tapered in cross section, and comprises an upper inclined surface adjoining the annular top surface; a lower concave surface adjoining the annular cavity; and a middle curved surface extending between the upper inclined surface and the lower concave surface.

5. The diesel engine according to claim 1, wherein the inclined collision surface is curved in cross section, and comprises an upper convex surface adjoining the annular top surface; and a lower concave surface adjoining the annular cavity.

6. The diesel engine according to claim 1, wherein the upper guide surface is convex in cross section.

7. The diesel engine according to claim 1, wherein the lower guide surface is flat, curved, right-angled, or concave in cross section.

8. The diesel engine according to claim 1, wherein the annular top surface is horizontal or inclined in cross section.

9. The diesel engine according to claim 1, wherein the annular top surface is concave in cross section and comprises an outermost annular inclined surface lower than the upper guide surface.

10. The diesel engine according to claim 1, wherein the annular top surface is concave in cross section and comprises an outermost annular inclined surface higher than the upper guide surface.

11. The diesel engine according to claim 1, wherein the annular top surface is recessed in cross section, and comprises a recessed horizontal surface; an outermost inclined surface; a first transitional surface extending between an inner end of the recessed horizontal surface and the upper guide surface; and a second transitional surface extending between an outer end of the recessed horizontal surface and the outermost inclined surface.

12. The diesel engine according to claim 1, wherein a center at the top side of the piston comprises a basin-shaped bottom surface.

13. A method for fuel distribution and combustion in a diesel engine, the diesel engine comprising:

a cylinder sleeve;

a cylinder head mounted on top of the cylinder sleeve and having a flat bottom surface;

a piston slidable in the cylinder sleeve;

a combustion chamber delimited by the cylinder sleeve, the cylinder head and the piston; and a fuel injector mounted at a center of the cylinder head for injecting a fuel jet in the combustion chamber, a top side of the piston comprising an annular cavity, an annular top surface, and an annular collision belt extending between the annular cavity and the annular top surface, the annular collision belt comprising an inclined collision surface, an upper guide surface extending between an upper and outer end of the inclined collision surface and the annular top surface, and a lower guide surface extending between a lower and inner end of the inclined collision surface and the annular cavity, the annular collision belt dividing the combustion chamber into a central portion disposed at an inner side of the annular collision belt, above the annular cavity and below the fuel jet, and a headspace disposed at an outer side of the annular collision belt and delimited by the annular top surface, the cylinder sleeve and the cylinder head, the combustion chamber further comprising an annular throat formed between the upper guide surface and the cylinder head, the inclined collision surface being configured to deflect an upper portion of the fuel jet into the headspace through the annular throat, and deflect a lower portion of the fuel jet into the annular cavity in the central portion, the upper portion of the fuel jet being greater than the lower portion of the fuel jet, wherein a volume of the headspace is more than three times of a volume of the central portion;

the method comprising:

setting a height (H1) of the headspace measuring from a horizontal surface of the annular top surface to the flat bottom surface of the cylinder head so that a ratio of the height (H1) of the headspace to a diameter (D2) of the piston is 6%<H1/D2<8% when the piston is at a top dead center;

setting a diameter (D) of the annular throat measuring at a highest point of the upper guide surface of the annular collision belt so that a ratio of the diameter (D) of the annular throat to the diameter (D2) of the piston is D/D2<0.45;

injecting the fuel jet from the fuel injector towards the inclined collision surface so that the upper portion of the fuel jet is deflected towards the upper guide surface and the lower portion of the fuel jet is deflected towards the lower guide surface, the upper portion of the fuel jet being greater than the lower portion of the fuel jet;

guiding, by the upper guide surface, the entire upper portion of the fuel jet through a lower region of the annular throat and into a lower region of the headspace;

directing, by the annular top surface, the upper portion of the fuel jet radially outwards towards the cylinder sleeve;

driving the upper portion of the fuel jet upwards along an inner surface of the cylinder sleeve, radially inwards along an upper region of the headspace, and then through an upper region of the annular throat; and guiding, by the lower guide surface, the lower portion of the fuel jet towards the annular cavity.

14. The method according to claim 13, further comprising, before the injecting step, setting a height (H2) of the upper guide surface measuring from the horizontal surface of the annular top surface to the highest point of the upper guide surface so that a ratio of the height (H2) of the upper guide surface to the height (H1) of the headspace is 15%<H2/H1<25%.

15. The method according to claim 13, further comprising, before the injecting step, providing the annular cavity with a circular arc in cross section extending between a lower portion of the annular collision belt and a lowest point at a bottom portion of the annular cavity, wherein the lower portion of the annular collision belt is tangent to the circular arc; and setting an angle α between a tangent line extending from the lower portion of the annular collision belt tangent to the circular arc and a central axis of the piston so that the angle α is less than 45 degrees.

* * * * *